Aug. 8, 1939.                E. L. CLOUD                2,168,472
                              AIR CLEANER
                          Filed April 7, 1937          2 Sheets-Sheet 1
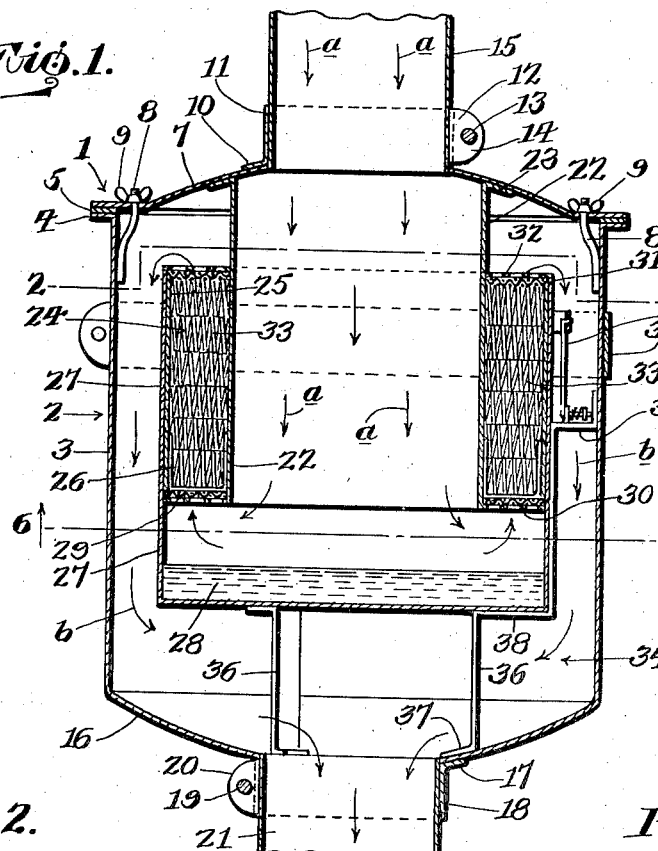
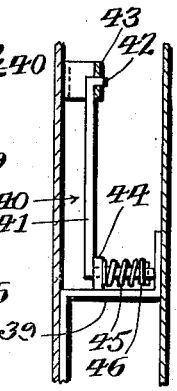
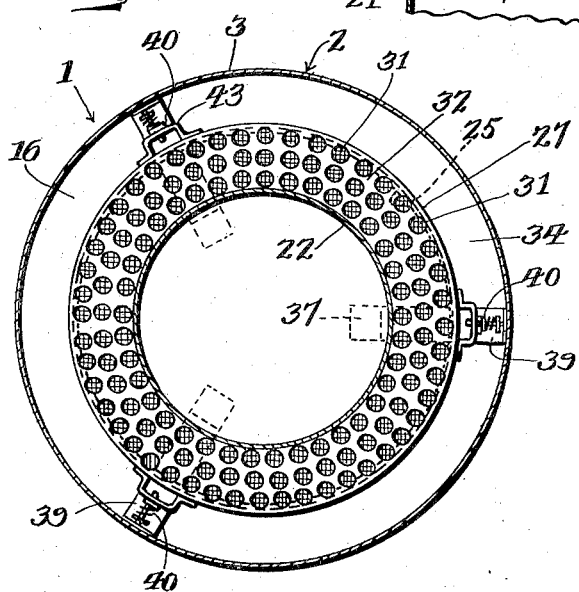
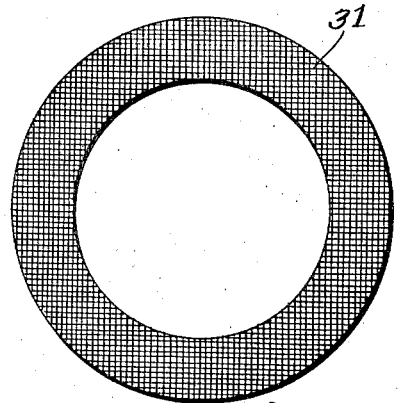
Fig. 1.
Fig. 2.
Fig. 3.
Fig. 4.
Inventor
*Earl L. Cloud*
By *Munn, Anderson & Liddy*
Attorneys Aug. 8, 1939.　　　　　E. L. CLOUD　　　　　2,168,472
AIR CLEANER
Filed April 7, 1937　　　2 Sheets-Sheet 2
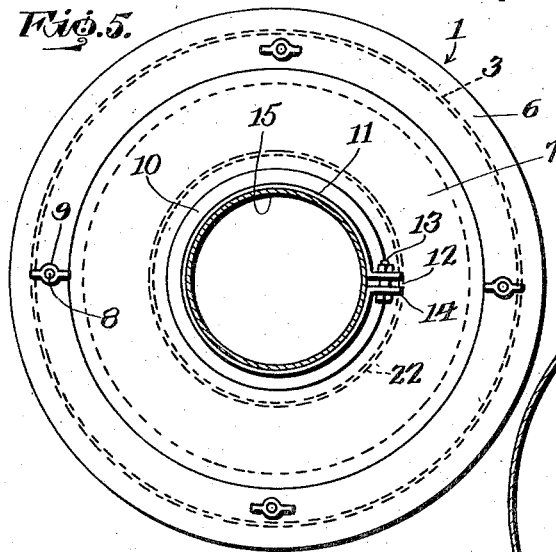
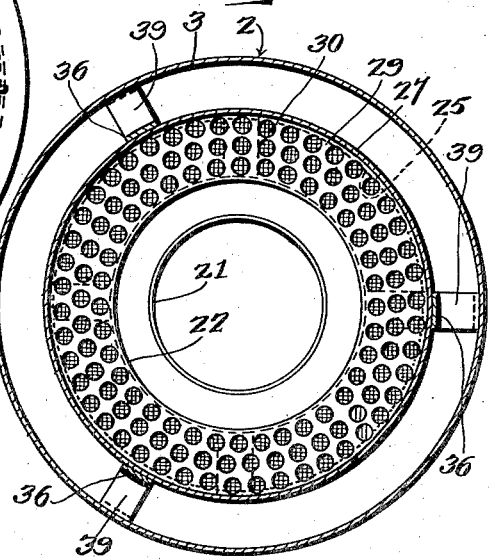
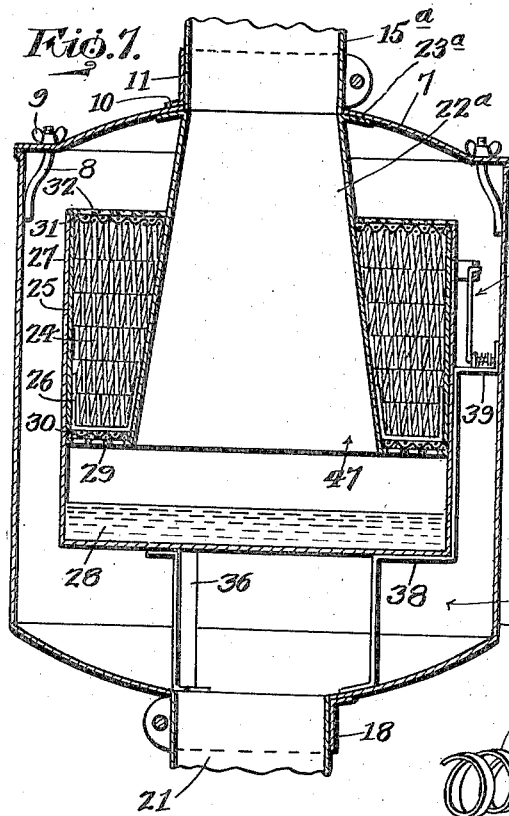
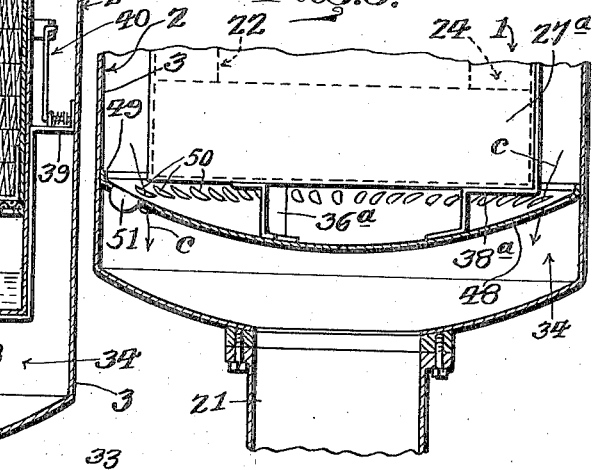
Inventor
Earl L. Cloud
By Munn, Anderson & Liddy
Attorneys Patented Aug. 8, 1939

2,168,472

UNITED STATES PATENT OFFICE 2,168,472

AIR CLEANER

Earl L. Cloud, Pampa, Tex.

Application April 7, 1937, Serial No. 135,570

1 Claim. (Cl. 183—22)

This invention relates to improvements in air cleaners, and its objects are as follow:

First, to provide an air cleaner for internal combustion engines wherein use is made of an oil bath to entrap dust in the incoming air, a special feature being a stepping up or enlargement of the inlet conduits as they approach the oil bath, thereby to slow the air stream and give the dust a chance to drop out.

Second, to provide an air cleaner so formed as to provide ample room on the inside for the storage of a large enough filter element to insure a thorough cleaning of the air especially for a slow-starting engine.

Third, to provide an air cleaner which embodies a novel arrangement of filter element, the members of which comprise spiral metallic strips which are coated with oil.

Fourth, to provide an air cleaner embodying a novel form of baffle for guarding the internal parts of the air cleaner from the force of backfiring.

Other objects and advantages will appear in the following specification, reference being had to the accompanying drawings, in which:

Figure 1 is a central vertical section of an air cleaner made in accordance with the invention, Figure 2 is a cross section taken on the line 2—2 of Figure 1, Figure 3 is an enlarged view of the spring fastener for holding the oil chamber in place, Figure 4 is a detail view of one of the screen rings, Figure 5 is a plan view of the air cleaner, a part being shown in section, Figure 6 is a cross section taken on the line 6—6 of Figure 1, Figure 7 is a central vertical section of an air cleaner illustrating a modification, Figure 8 is a detail sectional view of the air cleaner illustrating a further modification, and Figure 9 is a detail perspective view of one of the members of the filter element.

This air cleaner is particularly adapted for use in oil fields where relatively slow pumping engines are used. These engines are customarily turned over by hand in order to start them, and one of the important considerations which was had in mind in developing the air cleaner is to insure a constant cleansing of the air as drawn from the outer atmosphere. Further consideration was to insure ample provisions for the entrapping of dust and dirt because of prevailing difficulties that are experienced in many of the oil regions from this natural source of trouble.

It is desired to state at the outset, that the air cleaner is capable of being made according to a variety of sets of dimensions without departing from the spirit of the invention. It is not proposed to set out any dimensions herein, but it is thought important at least to state that the outer metal casing is most desirably made of stainless steel because of the fact that the atmosphere around oil and gas wells is often loaded with what is locally known as a sour gas that eats away practically all metals excepting stainless steel.

Attention is now directed to the drawings: The air cleaner, generally designed 1, in all forms of the invention, comprises an outer casing again generally designated 2. This casing consists of a cylinder 3 which is flanged at 4 around its upper edge. A gasket 5 of suitable material is laid upon this flange, whereupon the flange 6 of an arched cover 7 is put in place. A number of bolts 8 are secured to the cylinder 3. These project up through the properly spaced openings in the flange 6, whereupon wing nuts 9 are screwed on so as to clamp the cover down.

The cover 7 has the flange 10 of a clamp ring 11 secured to it. This ring is open at 12, so that when the bolt 13 is drawn tightly between the ears 14 of the clamp ring, the latter exerts a tight grip upon an air intake pipe 15. This pipe extends up from the air cleaner, and may either terminate inside of the building which houses the engine that is served by the air cleaner, or it may be made long enough to extend to the outside. The arrows a (Fig. 1) indicate the path of the incoming air.

The bottom 16 of the cylinder 3 is arched downwardly as shown, the flange 17 of a clamp ring 18 being secured to it as in the instance of the clamp ring 11. The tightening of the bolt 19 through the ears 20 of the bottom clamp ring, secures the air cleaner to the air valve (not shown) of the engine. The nature of this air valve is immaterial to an understanding of the invention, and it is sufficient to say that it has a short upstanding pipe 21 which provides a convenient place of attachment of the air cleaner by means of its clamp collar 18.

An air tube 22 (Fig. 1) depends from the cover 7. This tube is flanged at 23 to provide a convenient place at which to permanently affix the air tube to the cover. It is important to note at this point that the air tube is greater in diameter than the air intake pipe 15. The speed of the incoming current of air (arrows a) is diminished as it leaves the pipe 15 and enters the larger tube 22. This provision for a diminution of the speed of the air is intended to give the dust and dirt a chance to fall. The tube 22 thus constitutes a slowing chamber, so to speak, and its change in diameter to that of the air intake pipe 15 is an important contribution toward the functioning of the air cleaner.

In addition to its purpose of a slowing chamber, the tube 22 also constitutes the support for the filter element, generally designated 24. This element includes the outer wall 25 which is held spaced from and is carried by the tube 22 through the instrumentality of a sufficient number of brackets or braces 26. Upon loosening and removal of the wing nuts 9 it is possible to move the cover 7 from the casing 2 and lift the filter element 24 out, having first removed the pipe 15.

The wall 25 of the filter cartridge is operatively emplaced in the upper part of an oil chamber 27. This chamber is like a cup, open at the top and closed at the bottom. It is intended to contain a quantity of oil 28, into which much of the dust and dirt drops upon its release from the slowed air current through the tube 22. The filter cartridge comprises the tube 22 and the outer wall 25 to which the bottom and top grid rings 29, 32 are marginally secured, as are also the bottom and top screen rings 30, 31. The latter are placed immediately to the insides of the grid rings and they confine the contents of the space between the tube 22 and the outer wall 25.

Said contents are the actual filter element. This is preferably composed of a plurality of spirals 33 (Fig. 9). Each of these spirals consists of a strip of metal to the desired gage and cut to the desired width, bent into the form illustrated and approximately 2" in length. The spirals are coated with oil, the coating being accomplished in any desired way, whereupon they are nested between the tube 22 and the outer wall 25 in such a way as not to leave any holes for dirt to get through. In other words, the filter spirals produce such a tortuous passage for the air stream as to insure catching every particle of dirt that fails to fall into the oil pool 28. The bath of filtered air is indicated by the arrows b, these leading into the space 34 which constitutes a reservoir of filtered air to supply the engine upon its first being started up.

It is to be observed that this reservoir virtually surrounds the oil chamber 27. The latter is spaced in from the walls of the casing 3 on all sides. This provides an ample storage space for a considerable quantity of filtered air for the purpose already named. It should have been mentioned before that the air cleaner is stabilized by a clamp band 35 (Fig. 1) which at its open ends is intended to be fastened to a brace which extends over to a part of the engine, preferably the water outlet pipe (not shown).

In order to support the oil chamber 27 inside of the casing tube, provision is made of a plurality of support members 36 (Fig. 1). These are secured at 37 to the bottom 16. Thereafter they are bent into a succession of steps 38, 39. The oil chamber 27 is rested upon the steps 38. The steps 39 are used for the mounting of spring latches which hold the oil chamber down in position. Each spring latch, generally designated 40, comprises a wire 41 of a substantially L-shape. The upper end terminates in a hook 42 which fits in an opening in a lug 43 on the adjacent side of the oil chamber. The horizontal portion of the spring latch rides in a lug 44 on the step 39, and a spring 45 which abuts the lug 44 bears against a washer 46 on the horizontal portion of the wire, keeping the hook 42 in the engaged position. There is room enough for the displacement of the wire 41 toward the oil chamber 27 when it is desired to unlatch the oil chamber from the stationary support members 36.

Attention is next directed to Fig. 7 which illustrates a construction that is the same as Fig. 1 in all respects excepting the form of the air tube 22a. Instead of this being cylindrical, it flares from its attachment flange 23a, at which the inlet diameter is the same as that of the intake pipe 15a, to the full outlet diameter designated 47. The flaring air tube 22a causes a diminution in the speed of the air stream, but does not do it as suddenly as does the cylindrical tube 22. For this reason the latter is preferable, but the flaring air tube constitutes a possible construction.

In Fig. 8 use is made of a baffle plate which is intended to check the force of a back-fire upwards through the pipe 21. The baffle plate is preferably of convex form as illustrated. It has a marginal flange 49 by which the baffle plate is secured in the outer casing 2 in any preferred manner. The support members 36a are now necessarily made shorter than in Figs. 6 and 7, but the oil chamber 27a is again slid in position between the upright elements of the supporting members connecting the upper and lower steps and is rested upon the lower steps 38a as in the other instances. A peripheral series of perforations 50 provides an ample air passage, the lips or louvers 51, produced by making the perforations 50, serving to deflect the air downwards (arrows c) but interfering with the successful back flow of pressure fluid as when there is a back-fire in the pipe 21 as already stated.

I claim:

In an air cleaner, a casing having a bottom with a connected discharge pipe, twin-stepped support members in the casing having upright elements connecting the steps, an oil cup slid in position between the upright elements and rested on the lowermost steps, and means to which the bottom ends of the support members are secured so as to sustain said members and the oil cup, said means comprising a baffle plate marginally secured to the casing, and a peripheral series of perforations in said plate, the portions punched from the plate defining downwardly directed lips which deflect air downward.

EARL L. CLOUD.